US012802436B2

(12) United States Patent
Zhang

(10) Patent No.: US 12,802,436 B2
(45) Date of Patent: Nov. 17, 2026

(54) METHOD FOR IMAGE PROCESSING BY USING ARTIFICIAL INTELLIGENCE ACCELERATOR, AND CHIP

(71) Applicant: BEIJING HORIZON INFORMATION TECHNOLOGY CO., LTD., Beijing (CN)

(72) Inventor: Bin Zhang, Beijing (CN)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 282 days.

(21) Appl. No.: 18/656,992

(22) Filed: May 7, 2024

(65) Prior Publication Data

US 2024/0378879 A1 Nov. 14, 2024

(30) Foreign Application Priority Data

May 8, 2023 (CN) ........................ 202310513213.3

(51) Int. Cl.
*G06V 10/70* (2022.01)
*G06V 10/776* (2022.01)

(52) U.S. Cl.
CPC ............ *G06V 10/87* (2022.01); *G06V 10/776* (2022.01)

(58) Field of Classification Search
CPC .... G06V 10/87; G06V 10/776; G06F 9/5038; G06F 9/5044; G06F 9/5055;
(Continued)

(56) References Cited

U.S. PATENT DOCUMENTS 8,234,461 B2 * 7/2012 Steffler ............... G06F 11/1666 714/48
9,916,116 B2 3/2018 Ipek et al.
(Continued)

FOREIGN PATENT DOCUMENTS

JP 2022173094 A 11/2022

OTHER PUBLICATIONS

Extended European Search Report from corresponding European Patent Application No. 24174574.4, mailed on Dec. 19, 2024.
(Continued)

*Primary Examiner* — Han Hoang
(74) *Attorney, Agent, or Firm* — K&L Gates LLP

(57) ABSTRACT

Disclosed are a method for image processing by using an artificial intelligence accelerator, and a chip. The method includes: determining algorithm model information corresponding to a to-be-processed image; determining, based on the algorithm model information, an artificial intelligence accelerator that needs to execute algorithm model instructions corresponding to the algorithm model information; and reading the algorithm model instructions from a first preset storage space storing the algorithm model instructions by using the artificial intelligence accelerator, and executing the algorithm model instructions, to obtain a processing result for the to-be-processed image. According to the embodiments of this disclosure, a probability of image processing errors caused by an accelerator hardware failure or a memory hardware failure can be effectively reduced, thereby greatly improving safety of a vehicle during driving.

18 Claims, 8 Drawing Sheets

(58) Field of Classification Search
CPC ........... G06F 2209/509; G06F 11/2094; G06F 11/1479; G06N 3/045; G06N 3/063; G06T 1/20; G06T 1/60; Y02D 10/00
See application file for complete search history.

(56) References Cited

U.S. PATENT DOCUMENTS

| | | | | |
|---|---|---|---|---|
| 11,113,800 | B2 * | 9/2021 | Kaplanyan | G06T 5/70 |
| 2019/0114529 | A1 * | 4/2019 | Ng | G06N 3/063 |
| 2022/0108209 | A1 * | 4/2022 | Pudipeddi | G06F 12/109 |
| 2022/0342673 | A1 | 10/2022 | Wang et al. | |
| 2022/0358627 | A1 * | 11/2022 | Deng | G06N 3/09 |
| 2023/0022294 | A1 * | 1/2023 | Huang | G06F 9/4881 |

OTHER PUBLICATIONS

First Japanese office action from corresponding Japanese patent application No. 2024-075233, mailed on Feb. 12, 2025 and its English translation.

* cited by examiner

METHOD FOR IMAGE PROCESSING BY USING ARTIFICIAL INTELLIGENCE ACCELERATOR, AND CHIP

RELATED APPLICATION INFORMATION

This application claims priority to and the benefit of Chinese patent application Ser. No. 202310513213.3 filed on May 8, 2023, incorporated herein by reference.

FIELD OF THE INVENTION

This disclosure relates to the field of artificial intelligence chips, and in particular, to a method and an apparatus for image processing by using an artificial intelligence accelerator, and a chip.

BACKGROUND OF THE INVENTION

In scenarios such as autonomous driving and assisted driving, usually an artificial intelligence accelerator needs to be used to accelerate an algorithm model, so as to complete image processing such as perception and recognition on images collected by a sensor, to obtain a processing result. In an application process of the artificial intelligence accelerator in related technologies, a failure of accelerator-hardware or memory-hardware may easily lead to a relatively high probability of image processing errors, which further reduces safety of vehicle driving.

SUMMARY OF THE INVENTION

To resolve technical problems such as high probability of image processing errors caused by a hardware failure described above, embodiments of this disclosure provide a method and an apparatus for image processing by using an artificial intelligence accelerator, and a chip, so as to effectively reduce the probability of image processing errors caused by the hardware failure, and improve safety of vehicle driving.

According to a first aspect of this disclosure, a method for image processing by using an artificial intelligence accelerator is provided, including: determining algorithm model information corresponding to a to-be-processed image; determining, based on the algorithm model information, an artificial intelligence accelerator that needs to execute algorithm model instructions corresponding to the algorithm model information; and reading the algorithm model instructions from a first preset storage space storing the algorithm model instructions by using the artificial intelligence accelerator, and executing the algorithm model instructions, to obtain a processing result for the to-be-processed image.

According to a second aspect of this disclosure, an apparatus for image processing by using an artificial intelligence accelerator is provided, including: a first control module, configured to determine algorithm model information corresponding to a to-be-processed image; a second control module, configured to determine, based on the algorithm model information, an artificial intelligence accelerator that needs to execute algorithm model instructions corresponding to the algorithm model information; and the artificial intelligence accelerator, configured to read the algorithm model instructions from a first preset storage space storing the algorithm model instructions, and execute the algorithm model instructions, to obtain a processing result for the to-be-processed image.

According to a third aspect of this disclosure, an artificial intelligence chip is provided, including: a first preset storage space and an apparatus for image processing by using an artificial intelligence accelerator, wherein the apparatus for image processing by using an artificial intelligence accelerator is configured to implement the method for image processing by using an artificial intelligence accelerator according to the first aspect.

According to the method and apparatus for image processing by using an artificial intelligence accelerator, and the chip that are provided in the embodiments of this disclosure, when image processing needs to be performed, the algorithm model information corresponding to the to-be-processed image may be determined; and the artificial intelligence accelerator that needs to execute the algorithm model instructions corresponding to the algorithm model information may be determined based on the algorithm model information. In this way, the algorithm model instructions may be read from the first preset storage space storing the algorithm model instructions by using the determined artificial intelligence accelerator and may be executed, so as to obtain the processing result for the to-be-processed image. During the image processing, corresponding algorithm model information may be determined for different frames of to-be-processed images. Thus, during a process of calling artificial intelligence accelerators at different frames, image processing may be performed by using algorithm model instructions in different storage spaces or by calling different artificial intelligence accelerators. When a failure occurs to a storage space of any frame of image or to accelerator hardware, image processing at subsequent frames of this frame of image may be performed by using algorithm model instructions in other storage spaces or by calling other artificial intelligence accelerators. Therefore, continuous errors may be avoided, so that a probability of image processing errors caused by an accelerator hardware failure or a memory hardware failure may be effectively reduced, thereby greatly improving safety of a vehicle during driving.

DETAILED DESCRIPTION OF THE EMBODIMENTS

To explain this disclosure, exemplary embodiments of this disclosure are described below in detail with reference to accompanying drawings. Obviously, the described embodiments are merely a part, rather than all of embodiments of this disclosure. It should be understood that this disclosure is not limited by the exemplary embodiments.

It should be noted that unless otherwise specified, the scope of this disclosure is not limited by relative arrangement, numeric expressions, and numerical values of components and steps described in these embodiments.

Overview of the Present Disclosure

In a process of implementing this disclosure, the inventor finds that in scenarios such as autonomous driving and assisted driving, usually an artificial intelligence accelerator needs to be used to accelerate an algorithm model, so as to complete image processing such as perception and recognition on images collected by a sensor, to obtain a processing result. In an application process of the artificial intelligence accelerator in related technologies, a failure of accelerator hardware or memory hardware may easily lead to a relatively high probability of image processing errors, which further reduces safety of vehicle driving.

Exemplary Overview

Figure 1:
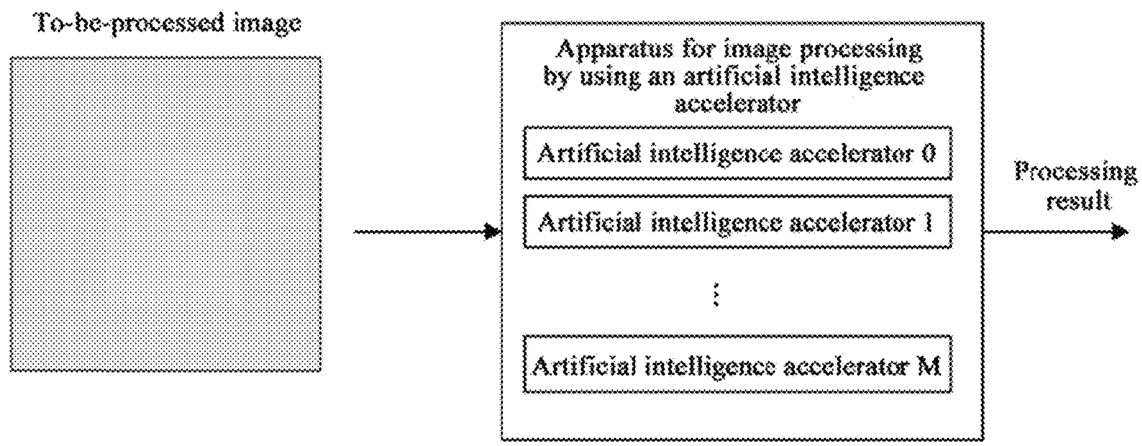
FIG. 1 shows an exemplary application scenario of a method for image processing by using an artificial intelligence accelerator according to this disclosure.

FIG. 1 shows an exemplary application scenario of a method for image processing by using an artificial intelligence accelerator according to this disclosure. When image processing needs to be performed, for a to-be-processed image, algorithm model information corresponding to the to-be-processed image may be determined by using the method for image processing by using an artificial intelligence accelerator (which is implemented based on an apparatus for image processing by using an artificial intelligence accelerator) in this disclosure. The algorithm model information may include at least one of identification information of algorithm model instructions, a storage space address of the algorithm model instructions, and other information. An artificial intelligence accelerator that needs to execute the algorithm model instructions corresponding to the algorithm model information may be determined based on the algorithm model information. In this way, the algorithm model instructions may be read from a first preset storage space storing the algorithm model instructions by using the determined artificial intelligence accelerator and may be executed, so as to obtain a processing result for the to-be-processed image. During the image processing, corresponding algorithm model information may be determined for different frames of to-be-processed images. Thus, during a process of calling different frames of artificial intelligence accelerators, image processing may be performed by using algorithm model instructions in different storage spaces or calling different artificial intelligence accelerators. For example, same algorithm model instructions are stored in multiple storage spaces of a memory, respectively. Corresponding algorithm model information is set for the algorithm model instructions in each storage space. During image processing, the algorithm model instructions in the storage spaces are used for the image processing in turns according to a certain frame interval. For another example, multiple artificial intelligence accelerators are called for image processing in turns according to a certain frame interval. The specific frame interval may be set according to actual requirements. For example, the frame interval may be 1 frame, 2 frames, 3 frames, and the like. On this basis, when a failure occurs to a storage space of any frame of image or to accelerator hardware, subsequent frames of images of this frame of image may be processed by using algorithm model instructions from other storage spaces or by calling other artificial intelligence accelerators. Therefore, continuous image processing errors may be avoided, so that a probability of image processing errors caused by an accelerator hardware failure or a memory hardware failure may be effectively reduced, thereby greatly improving safety of a vehicle during driving.

The method for image processing by using an artificial intelligence accelerator in embodiments of this disclosure may be applied to any field or scenario that requires image processing by using an artificial intelligence accelerator, such as an autonomous driving scenario, an assisted driving scenario, and application scenarios for terminal devices such as a mobile phone and a tablet. Specific fields and scenarios are not limited.

Exemplary Method

Figure 2:
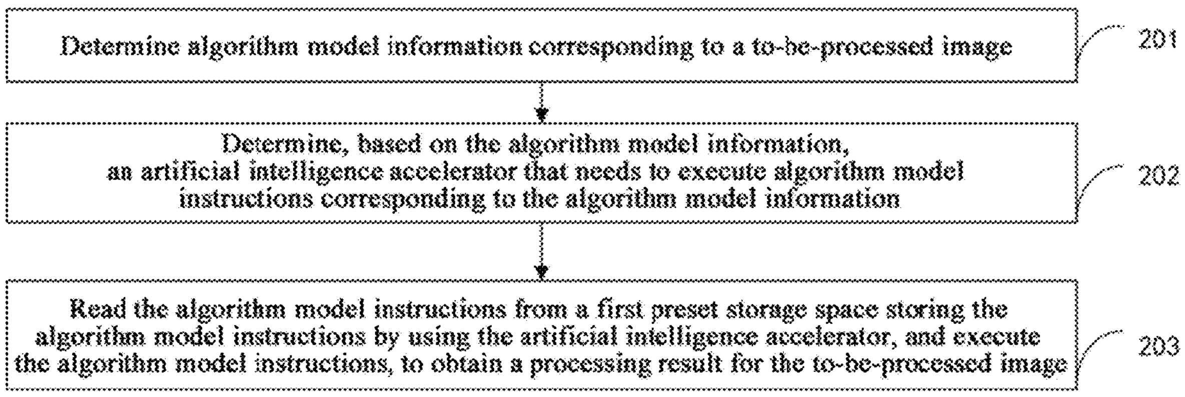
FIG. 2 is a schematic flowchart of a method for image processing by using an artificial intelligence accelerator according to an exemplary embodiment of this disclosure.

FIG. 2 is a schematic flowchart of a method for image processing by using an artificial intelligence accelerator according to an exemplary embodiment of this disclosure. This embodiment may be applicable to an electronic device, such as an in-car computing platform. As shown in FIG. 2, the method includes the following steps.

Step 201. Determine algorithm model information corresponding to a to-be-processed image.

The algorithm model information may include at least one of identification information of algorithm model instructions, a storage space address of the algorithm model instructions, a name of an algorithm model, and other information. The algorithm model information corresponding to the to-be-processed image of the algorithm model may be determined according to a pre-configured mapping rule. The mapping rule may be set according to actual requirements.

In some optional embodiments, the algorithm model information may include relevant information corresponding to at least one algorithm model. For example, for the autonomous driving scenario, the algorithm model information may include a forward visual perception model, a panoramic perception model, a DMS (driver monitor system) perception model, a perception fusion model, a prediction model, a planning model, a diagnostic model, a laser radar perception model, and the like. Processing for the to-be-processed image may include direct processing based on the perception model and subsequent applications of a perception result based on the planning model. Therefore, complete vehicle planning and control may be performed based on the to-be-processed image. This may be set according to actual requirements.

In some optional embodiments, the to-be-processed image may include images from one or more perspectives of a current frame, for example, may include a front view image and a panoramic image. Images from different perspectives may correspond to different algorithm models. The algorithm model information includes relevant information of a set of algorithm model instructions required for the image processing.

In some optional embodiments, the mapping rule may be set according to frame information of the to-be-processed image. For example, for a same set of algorithm models, the algorithm model instructions thereof may be copied for multiple times and be respectively stored in different storage subspaces in a first preset storage space (such as a memory). Corresponding algorithm model information is set for each copy of the algorithm model instructions, to uniquely identify different copies of the algorithm model instructions. Multiple pieces of algorithm model information may be obtained, and a mapping rule may be established between the frame information and the algorithm model information, wherein, for example, the frame information corresponds to various pieces of algorithm model information in turns according to a preset frame interval. Taking three pieces of algorithm model information as an example, if the preset frame interval is 1, a $(n+1)^{th}$ frame corresponds to algorithm model information 1, a $(n+2)^{th}$ frame corresponds to algorithm model information 2, and a $(n+3)^{th}$ frame corresponds to algorithm model information 3. n=0, 1, . . . . The preset frame interval may also be set to 2, 3, 4, or the like, which is not specifically limited.

In some optional embodiments, for the same set of algorithm models, only one copy of the algorithm model instructions may be copied and stored in the first preset storage space.

Step 202. Determine, based on the algorithm model information, an artificial intelligence accelerator that needs to execute algorithm model instructions corresponding to the algorithm model information.

There may be one or more artificial intelligence accelerators (which may be referred to as accelerators for short). The artificial intelligence accelerator that needs to execute the algorithm model instructions corresponding to the algorithm model information may be determined according to a pre-configured rule. The specific rule may be set according to actual requirements.

In some optional embodiments, there may be multiple pieces of algorithm model information, and there may be one or more pre-configured artificial intelligence accelerators that may be configured to execute the algorithm model instructions corresponding to the algorithm model information. If there is one optional artificial intelligence accelerator, current algorithm model information is determined based on the to-be-processed image. Based on the algorithm model information, it is directly determined that the artificial intelligence accelerator is configured to execute the algorithm model instructions corresponding to the algorithm model information. If there are multiple optional artificial intelligence accelerators, the accelerator currently configured to execute the algorithm model instructions may be determined from the multiple artificial intelligence accelerators according to the pre-configured rule. For example, the multiple accelerators are called in turns according to the frame interval, or the multiple accelerators are called simultaneously for each frame to execute different parts of the algorithm model instructions. This may be set according to actual requirements, provided that continuous errors in image processing can be effectively reduced.

In some optional embodiments, there is one piece of pre-configured algorithm model information and one optional accelerator. Different computing units in the accelerator may be called in turns according to the frame interval to execute the algorithm model instructions, so as to reduce continuous errors caused by hardware failures of the computing units. In this way, the continuous errors in image processing may be reduced, so that a probability of image processing errors caused by an accelerator hardware failure is reduced, and safety of vehicle driving is further improved.

In some optional embodiments, if there is one piece of pre-configured algorithm model information and multiple pre-configured optional accelerators, the frames each correspond to the same algorithm model information. The accelerator currently configured to execute the algorithm model instructions may be determined from the multiple artificial intelligence accelerators according to the pre-configured rule. For example, the multiple accelerators are called in turns according to the frame interval, or the multiple accelerators are called simultaneously for each frame to execute different parts of the algorithm model instructions, etc. This may be set according to actual requirements.

In some optional embodiments, for the case in which the multiple accelerators are called simultaneously for each frame to execute different parts of the algorithm model instructions, for each accelerator, the different parts of the algorithm model instructions may be executed in turns at different frames. For example, the algorithm model instructions is divided into multiple parts based on a quantity of algorithm models, including such as an algorithm part 1, an algorithm part 2, and an algorithm part 3. There are three accelerators. At a $(n+1)^{th}$ frame, an accelerator 1 executes the algorithm part 1, an accelerator 2 executes the algorithm part 2, and an accelerator 3 executes the algorithm part 3. At a $(n+2)^{th}$ frame, the accelerator 1 executes the algorithm part 2, the accelerator 2 executes the algorithm part 3, and the accelerator 3 executes the algorithm part 1. At a $(n+3)^{th}$ frame, the accelerator 1 executes the algorithm part 3, the accelerator 2 executes the algorithm part 1, and the accelerator 3 executes the algorithm part 2.

Step 203. Read the algorithm model instructions from a first preset storage space storing the algorithm model instructions by using the artificial intelligence accelerator, and execute the algorithm model instructions, to obtain a processing result for the to-be-processed image.

After the artificial intelligence accelerator is determined, the storage space address of the algorithm model instructions may be sent to the accelerator, so that the accelerator reads the algorithm model instructions from the first preset storage space storing the algorithm model instructions and executes the algorithm model instructions, so as to finally obtain the processing result.

In some optional embodiments, for a case in which multiple accelerators are used for execution, each accelerator reads a part of the algorithm model instructions that needs to be executed thereby and executes the same to obtain a respective processing result. The processing result for the to-be-processed image is obtained based on processing results of the multiple accelerators.

In some optional embodiments, the artificial intelligence accelerator includes computing units used for various operations in the algorithm model. Corresponding operations of the algorithm model are implemented by controlling calculation of the computing unit by using the algorithm model instructions, so as to obtain the processing result for the to-be-processed image.

In some optional embodiments, model parameters required for inference of the accelerator may also be stored in the first preset storage space or other storage spaces. For example, the model parameters are weight, bias, and other parameters. The accelerator may read the corresponding model parameters and execute the algorithm model instructions to complete inference calculation of the algorithm model.

In some optional embodiments, the first preset storage space may be a memory space.

According to the method for image processing by using an artificial intelligence accelerator provided in the embodiments, when image processing needs to be performed, the algorithm model information corresponding to the to-be-processed image may be determined; and the artificial intelligence accelerator that needs to execute the algorithm model instructions corresponding to the algorithm model information may be determined based on the algorithm model information. In this way, the algorithm model instructions may be read from the first preset storage space storing the algorithm model instructions by using the determined artificial intelligence accelerator and may be executed, so as to obtain the processing result for the to-be-processed image. During the image processing, corresponding algorithm model information may be determined for different frames of to-be-processed images. Thus, during a process of calling artificial intelligence accelerators at different frames, image processing may be performed by using same algorithm model instructions in different storage spaces or by calling different artificial intelligence accelerators. When a failure occurs to a storage space of any frame of image or to accelerator hardware, subsequent frames of images of this frame of image may be processed by using algorithm model instructions from other storage spaces or by calling other artificial intelligence accelerators. Therefore, continuous errors may be avoided, so that a probability of image processing errors caused by an accelerator hardware failure or a memory hardware failure may be effectively reduced, thereby greatly improving safety of a vehicle during driving.

Figure 3:
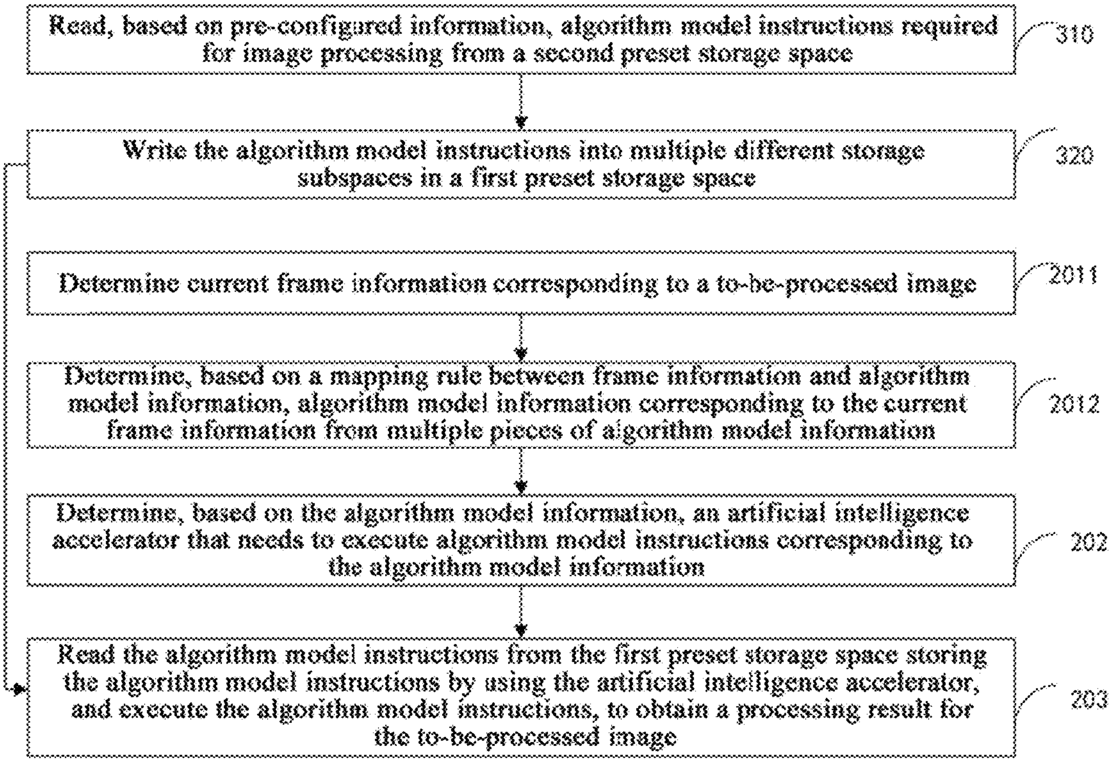
FIG. 3 is a schematic flowchart of a method for image processing by using an artificial intelligence accelerator according to another exemplary embodiment of this disclosure.

FIG. 3 is a schematic flowchart of a method for image processing by using an artificial intelligence accelerator according to another exemplary embodiment of this disclosure.

In some optional embodiments, step 201 of determining the algorithm model information corresponding to the to-be-processed image includes the following steps.

Step 2011. Determine current frame information corresponding to the to-be-processed image.

The current frame information may include a number of a frame to which the to-be-processed image belongs. For example, the current frame information includes that the to-be-processed image belongs to an $N^{th}$ frame.

In some optional embodiments, for example, continuous image processing is usually required in an autonomous driving scenario. In this case, frame information of a processed image may be recorded from beginning of the image processing, and may be maintained in a real-time manner. When the to-be-processed image is obtained, the current frame information corresponding to the to-be-processed image may be determined based on the frame information maintained in a real-time manner.

Step 2012. Determine, based on a mapping rule between the frame information and the algorithm model information, algorithm model information corresponding to the current frame information from multiple pieces of algorithm model information.

The multiple pieces of algorithm model information respectively correspond to same algorithm model instructions in different storage subspaces in the first preset storage space. The mapping rule between the frame information and the algorithm model information may be set according to actual requirements. For example, a corresponding relationship between each frame and the algorithm model information is established according to the preset frame interval. The preset frame interval may be set according to actual requirements, which is not limited in this disclosure.

In some optional examples, if the preset frame interval is 1 frame and there are m pieces of algorithm model information, a first frame corresponds to algorithm model information 1, a second frame corresponds to algorithm model information 2, a third frame corresponds to algorithm model information 3, . . . , an $m^{th}$ frame corresponds to algorithm model information m, a $(m+1)^{th}$ frame corresponds to the algorithm model information 1, again, a $(m+2)^{th}$ frame corresponds to the algorithm model information 2, . . . , and a $2m^{th}$ frame corresponds to the algorithm model information m. The others may be deduced by analogy.

In some optional examples, if the preset frame interval is 2 frames and there are m pieces of algorithm model information, a first frame corresponds to algorithm model information 1, a second frame corresponds to the algorithm model information 1, a third frame corresponds to algorithm model information 2, a fourth frame corresponds to the algorithm model information 2, . . . , a $(2m-1)^{th}$ frame corresponds to algorithm model information m, a $2m^{th}$ frame corresponds to the algorithm model information m, a $(2m+1)^{th}$ frame corresponds to the algorithm model information 1, . . . .

In this embodiment, according to the mapping rule between the frame information and the algorithm model information, different frames of to-be-processed images may use algorithm model instructions in different storage subspaces. When an error occurs to the algorithm model instructions due to a hardware failure in a storage space of any frame of image, because image processing of subsequent frames of this frame of image may use the algorithm model instructions in other storage subspaces, continuous errors caused by the hardware failure in the storage space may be effectively avoided. In this case, the continuous errors may be converted into sporadic or intermittent errors, thereby greatly prolonging error tolerance time and helping further improve safety of a vehicle during driving in combination with error detection.

In some optional embodiments, before step 201 of determining the algorithm model information corresponding to the to-be-processed image, the method further includes the following steps.

Step 310. Read, based on pre-configured information, algorithm model instructions required for image processing from a second preset storage space.

The pre-configured information may be set according to requirements for actual functions. For example, in the autonomous driving scenario, for a function of planning and controlling based on a perception result, the pre-configured information may include relevant information about an algorithm model required for planned and controlled image processing. For example, the pre-configured information may include relevant information about algorithm models such as a forward visual perception model, a panoramic perception model, a DMS (driver monitor system) perception model, a perception fusion model, a prediction model, a planning model, and a diagnostic model. The relevant information may include a storage address and other relevant information of the algorithm model instructions corresponding to each algorithm model in the second preset storage space, which may be specifically set according to actual requirements. The pre-configured information may also include relevant operations that need to be performed, such as a read operation, a write operation, and write counts. Therefore, the algorithm model instructions for each algorithm model required for image processing may be read from the corresponding address in the second preset storage space based on the pre-configured information.

In some optional embodiments, the second preset storage space may be a storage space in an external memory such as a hard disk, a floppy disk, or a compact disc.

Step 320. Write the algorithm model instructions into multiple different storage subspaces in the first preset storage space.

After the algorithm model instructions required for the image processing is read, the algorithm model instructions may be written into multiple different storage subspaces in the first preset storage space based on the write operation, the write counts, and other write information in the pre-configured information. In this case, multiple copies of the identical algorithm model instruction may be stored in the first preset storage space. In this way, the algorithm model information corresponding to the current frame information is determined from multiple pieces of algorithm model information according to the mapping rule between the frame information and the algorithm model information. Moreover, after the accelerator for executing the algorithm model instructions corresponding to the algorithm model information is determined, the algorithm model instructions may be read and executed from the storage subspace corresponding to the algorithm model information in the first preset storage space by using the corresponding accelerator.

According to this embodiment, the algorithm model instructions of a set of algorithm models required for the image processing are read from the second preset storage space and are written into the multiple different storage subspaces in the first preset storage space, so that multiple copies of an identical algorithm model instruction are stored in the first preset storage space, which provides effective data support for subsequent sequential use of the algorithm model instructions. Therefore, when a hardware failure occurs to any storage subspace, due to subsequent use of the algorithm model instructions in other storage subspaces, continuous errors caused by hardware failures in some of the storage subspaces may be effectively avoided, so that the continuous errors may be converted into intermittent errors, thereby effectively prolonging error tolerance time, and thus helping improve error detection coverage.

Figure 4:
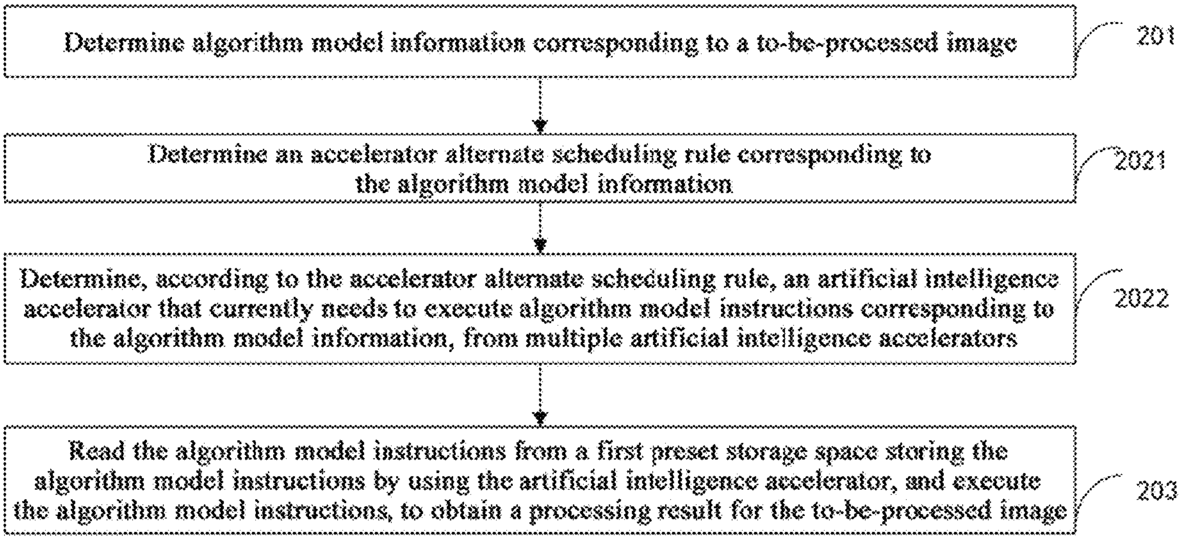
FIG. 4 is a schematic flowchart of a method for image processing by using an artificial intelligence accelerator according to still another exemplary embodiment of this disclosure.

FIG. 4 is a schematic flowchart of a method for image processing by using an artificial intelligence accelerator according to still another exemplary embodiment of this disclosure.

In some optional embodiments, step 202 of determining, based on the algorithm model information, the artificial intelligence accelerator that needs to execute the algorithm model instructions corresponding to the algorithm model information includes the following steps.

Step 2021. Determine an accelerator alternate scheduling rule corresponding to the algorithm model information.

The accelerator alternate scheduling rule characterizes a rule for alternately scheduling multiple accelerators. To be specific, there are multiple optional accelerators, which are scheduled according to the accelerator alternate scheduling rule to execute the algorithm model instructions corresponding to the algorithm model information. The accelerator alternate scheduling rule corresponding to the algorithm model information may be determined based on a pre-configured corresponding relationship. For example, different accelerator alternate scheduling rules may be set for different algorithm model groups. Thus, the accelerator alternate scheduling rule corresponding to the algorithm model group may be determined based on the algorithm model information.

In some optional embodiments, the accelerator alternate scheduling rules may include scheduling multiple accelerators alternately according to the preset frame interval, which may be set according to actual requirements. For example, if the preset frame interval is 1, the accelerator 1 is correspondingly scheduled at the first frame, the accelerator 2 is correspondingly scheduled at a second frame, an accelerator n is correspondingly scheduled at an $n^{th}$ frame, the accelerator 1 is correspondingly scheduled at the $(n+1)^{th}$ frame, the accelerator 2 is correspondingly scheduled at the $(n+2)^{th}$ frame, and the others may be deduced by analogy. n is a quantity of the accelerators.

In some optional embodiments, the accelerator alternate scheduling rule may include a scheduling sequence of the multiple accelerators, and may also include a quantity of accelerators scheduled each time. For example, the scheduling sequence is accelerator 1-accelerator 2-accelerator 3-accelerator 1-accelerator 2-accelerator 3- . . . .

Step 2022. Determine, according to the accelerator alternate scheduling rule and from multiple artificial intelligence accelerators, the artificial intelligence accelerator that currently needs to execute the algorithm model instructions corresponding to the algorithm model information.

There may be one or more artificial intelligence accelerators that currently need to execute the algorithm model instructions corresponding to the algorithm model information, which may be specifically set according to actual requirements.

In some optional embodiments, one accelerator may be scheduled at each frame according to the preset frame interval to execute the algorithm model instructions corresponding to the algorithm model information. For example, the accelerator 1 is scheduled at a $(t+1)^{th}$ frame, the accelerator 2 is scheduled at a $(t+2)^{th}$ frame, . . . , and the accelerator n is scheduled at a $(t+n)^{th}$ frame, where t=0, 1, 2, . . . , and n is a quantity of accelerators.

In some optional embodiments, at least two accelerators may be scheduled at each frame according to the preset frame interval to collaboratively execute the algorithm model instructions. For example, the algorithm model instructions are divided into algorithm model instructions respectively corresponding to multiple algorithm model groups based on algorithm models included in the algorithm model instructions, and each accelerator executes algorithm model instructions corresponding to one algorithm model group. The at least two accelerators may include some or all of the multiple optional accelerators. For example, there are 6 optional accelerators, two accelerators are scheduled at each frame to collaboratively execute the algorithm model instructions of two divided algorithm model groups, and the accelerators are alternately scheduled according to the preset frame interval. For example, an accelerator 1 and an accelerator 2 are scheduled at a first frame, an accelerator 3 and an accelerator 4 are scheduled at a second frame, an accelerator 5 and an accelerator 6 are scheduled at a third frame, the accelerator 1 and the accelerator 2 are scheduled at a fourth frame, and the others may be deduced by analogy. Alternatively, the accelerator 1 and the accelerator 2 are scheduled at the first frame, the accelerator 2 and the accelerator 3 are scheduled at the second frame, the accelerator 3 and the accelerator 4 are scheduled at the third frame, and the others may be deduced by analogy. Other alternate scheduling rules may also be used, provided that each accelerator does not execute a same algorithm model instruction more than a preset quantity of times consecutively. The specific alternate scheduling rule is not limited.

According to this embodiment, according to the accelerator alternate scheduling rule, multiple accelerators may be scheduled alternately, so that each accelerator would not execute a same algorithm model instruction multiple times consecutively. Thus, continuous errors caused by an accelerator hardware failure may be effectively reduced. Turning the continuous errors caused by the accelerator hardware failure into intermittent errors greatly prolongs error tolerance time, which provides effective time support for error detection of accelerator hardware, thereby helping further improve safety of a vehicle during driving.

In some optional embodiments, step 2022 of determining, according to the accelerator alternate scheduling rule and from multiple artificial intelligence accelerators, the artificial intelligence accelerator that currently needs to execute the algorithm model instructions corresponding to the algorithm model information includes:

- determining an accelerator alternation sequence according to the accelerator alternate scheduling rule; and determining, according to the accelerator alternation sequence, the artificial intelligence accelerator that currently needs to execute the algorithm model instructions corresponding to the algorithm model information.

The accelerator alternation sequence may be set according to actual requirements. For example, if there are three accelerators, the accelerator alternation sequence is accelerator 1-accelerator 2-accelerator 3, indicating that the accelerator 1 to the accelerator 3 are alternated cyclically.

In some optional embodiments, there may be one or more artificial intelligence accelerators that are determined according to the accelerator alternation sequence and that currently need to execute the algorithm model instructions corresponding to the algorithm model information. For a case of multiple accelerators, the multiple accelerators collaboratively process the algorithm model instructions. For details, reference may be made to the content described above, and details are not described herein again.

According to the embodiments, by determining the accelerator alternation sequence, the artificial intelligence accelerator that currently needs to execute the algorithm model instructions corresponding to the algorithm model information may be effectively determined according to this sequence, to provide effective assurance for alternate scheduling of accelerators.

Figure 5:
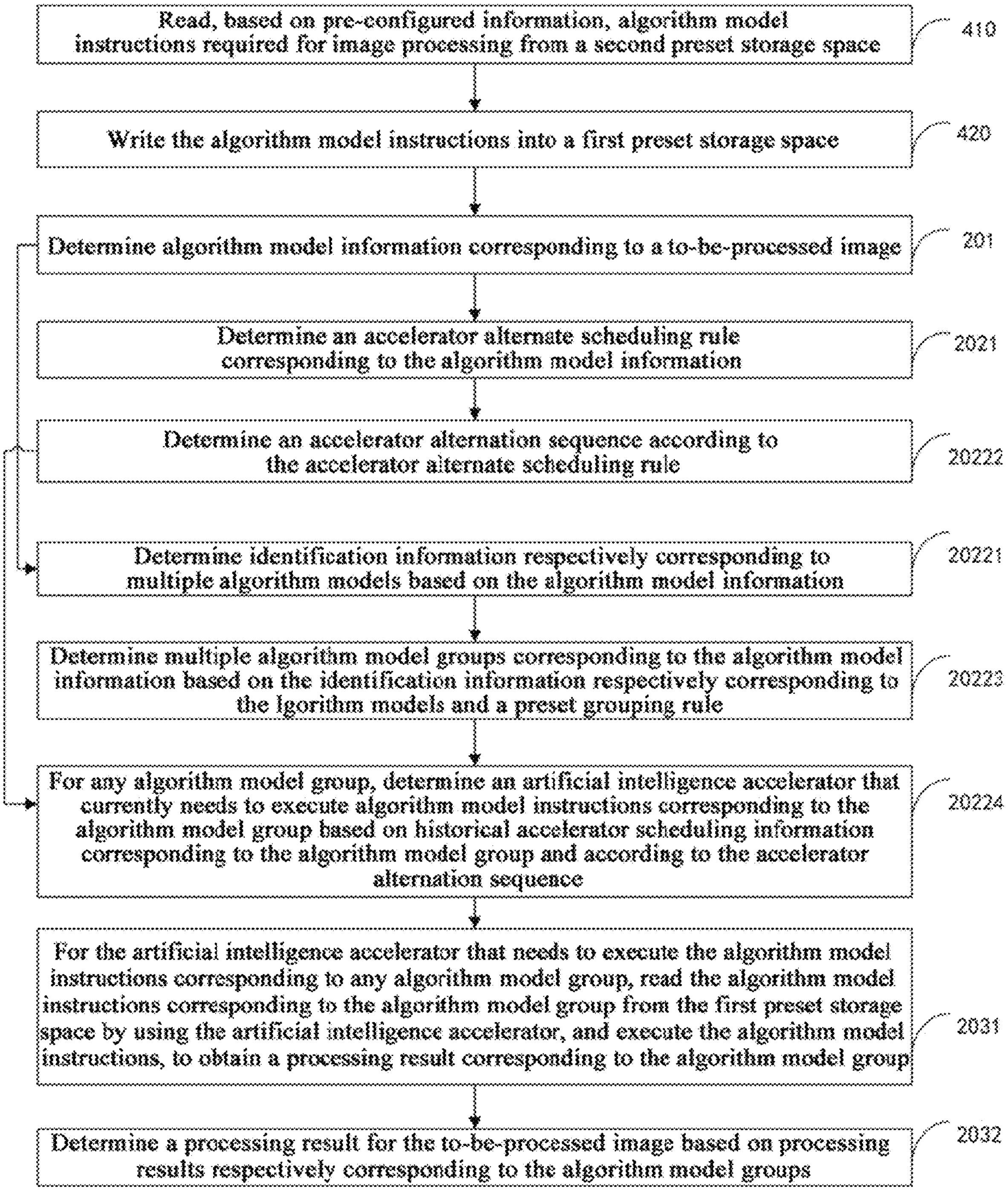
FIG. 5 is a schematic flowchart of a method for image processing by using an artificial intelligence accelerator according to yet another exemplary embodiment of this disclosure.

FIG. 5 is a schematic flowchart of a method for image processing by using an artificial intelligence accelerator according to yet another exemplary embodiment of this disclosure.

In some optional embodiments, step 2022 of determining, according to the accelerator alternate scheduling rule and from multiple artificial intelligence accelerators, the artificial intelligence accelerator that currently needs to execute the algorithm model instructions corresponding to the algorithm model information includes:

Step 20221. Determine identification information respectively corresponding to multiple algorithm models based on the algorithm model information.

The identification information corresponding to the algorithm model may be set according to actual requirements, provided that the algorithm model can be uniquely identified. This is not limited in this disclosure. For example, the identification information of the algorithm model may be a name of the algorithm model or an ID set for the algorithm model. The algorithm model information may include an overall identifier of a set of algorithm model instructions required for image processing, and may also include the identification information of each algorithm model, a storage space address of the algorithm model instructions corresponding to each algorithm model, and other relevant information. This may be specifically set according to actual requirements. Based on the algorithm model information, the identification information corresponding to each algorithm model included therein may be determined.

Step 20222. Determine an accelerator alternation sequence according to the accelerator alternate scheduling rule.

Step 20223. Determine multiple algorithm model groups corresponding to the algorithm model information based on the identification information respectively corresponding to the algorithm models and a preset grouping rule.

Each algorithm model group includes identification information of at least one algorithm model. The preset grouping rule may be set according to actual requirements. For example, the preset grouping rule may be set randomly, or may be set according to a principle of load balance based on computing power required by each algorithm model, so as to ensure load balance of the accelerator and improve processing efficiency. Multiple algorithm model groups corresponding to the algorithm model information may also be determined in any other implementable manners, which is not specifically limited.

For example, algorithm models included in the algorithm model information include a forward visual perception model, a panoramic perception model, a DMS perception model, a perception fusion model, a prediction model, a planning model, a diagnostic model, a laser radar perception model, which are classified into three algorithm model groups. An algorithm model group 1 includes the forward visual perception model, the panoramic perception model, and the laser radar perception model. An algorithm model group 2 includes the perception fusion model and the DMS perception model. An algorithm model group 3 includes the prediction model, the planning model, and the diagnostic model.

Step 20224. For any algorithm model group, determine an artificial intelligence accelerator that currently needs to execute algorithm model instructions corresponding to the algorithm model group based on historical accelerator scheduling information corresponding to the algorithm model group and according to the accelerator alternation sequence.

The historical accelerator scheduling information includes an accelerator scheduling situation at a previous frame, which may be used to determine a position for scheduling the accelerator at the current frame.

In some optional embodiments, for different algorithm model groups, different initial accelerators may be set for scheduling. For example, at the first frame, the algorithm model group 1 correspondingly schedules the accelerator 1, the algorithm model group 2 correspondingly schedules the accelerator 2, the algorithm model group 3 correspondingly schedules the accelerator 3, and the others may be deduced by analogy. In processing of subsequent frames, each algorithm model group alternately schedules all accelerators according to the same accelerator alternation sequence, so as to ensure that multiple accelerators can collaboratively complete algorithm model instructions of multiple algorithm model groups at each frame, and each algorithm model group can alternately schedule all the accelerators according to the preset frame interval. For example, based on the historical accelerator scheduling information of the first frame, at the second frame, using three accelerators as an example, according to an alternation sequence of accelerators 1-2-3, the algorithm model group 1 needs to schedule the accelerator 2, the algorithm model group 2 needs to schedule the accelerator 3, and the algorithm model group 3 needs to schedule the accelerator 1. At the third frame, the algorithm model group 1 needs to schedule the accelerator 3, the algorithm model group 2 needs to schedule the accelerator 1, the algorithm model group 3 needs to schedule the accelerator 2, and the others may be deduced by analogy.

In this embodiment, by determining multiple algorithm model groups corresponding to the algorithm model information, the algorithm model instructions corresponding to the algorithm model information is divided into algorithm model instructions respectively corresponding to the multiple algorithm model groups. Scheduling the multiple accelerators according to the accelerator alternation sequence to execute the algorithm model instructions respectively corresponding to the algorithm model groups may reduce a probability of image processing errors caused by accelerator hardware, and improve resource utilization of the accelerators, thereby effectively improving image processing efficiency.

In some optional embodiments, multiple accelerators may be scheduled in combination with the multiple pieces of algorithm model information and the multiple algorithm model groups corresponding to each piece of algorithm model information, to alternately execute the algorithm model instructions respectively corresponding to the algorithm model groups. In this way, continuous errors caused by a memory hardware failure and continuous errors caused by an accelerator hardware failure may be converted into intermittent errors, to further prolong error tolerance time and provide effective time support for error detection of memory hardware and accelerator hardware. This may further reduce the probability of image processing errors and help improve safety of a vehicle during driving in combination with error detection for the memory hardware and the accelerator hardware.

Figure 6:
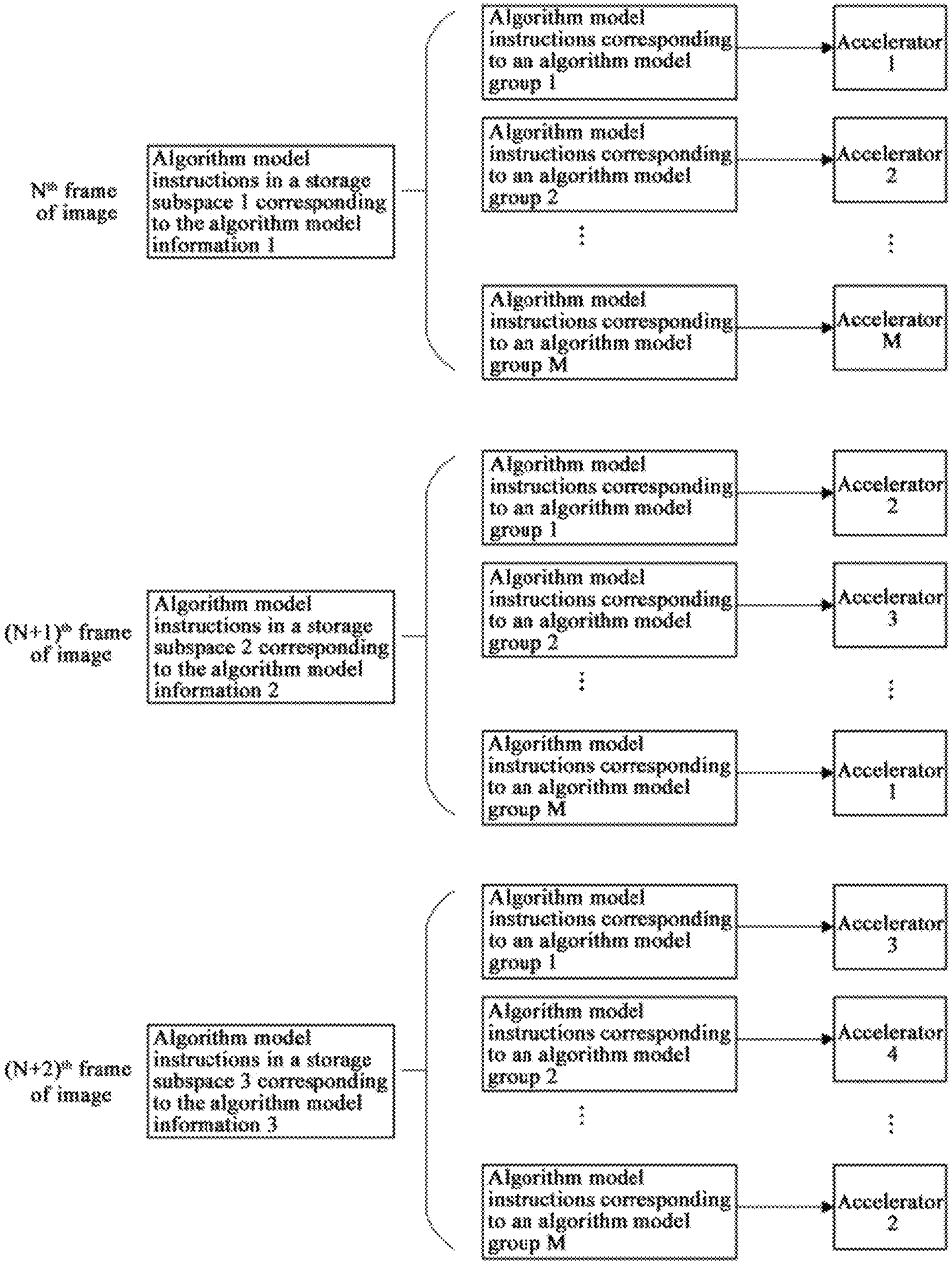
FIG. 6 is a schematic diagram of accelerator scheduling for multi-frame image processing according to an exemplary embodiment of the present disclosure.

For example, FIG. 6 is a schematic diagram of accelerator scheduling for multi-frame image processing according to an exemplary embodiment of the present disclosure. In this example, there are three pieces of algorithm model information, which are represented as algorithm model information 1, algorithm model information 2, and algorithm model information 3. To be specific, a same algorithm model instruction is stored in three different storage subspaces (including a storage subspace 1 corresponding to the algorithm model information 1, a storage subspace 2 corresponding to the algorithm model information 2, and a storage subspace 3 corresponding to the algorithm model information 3) of the first preset storage space. There are M algorithm model groups corresponding to the algorithm model information, and there are M accelerators. At an $N^{th}$ frame, the M algorithm model groups, that correspond to the algorithm model information 1 and include algorithm model groups 1 to M, may be determined by using the algorithm model instructions in the storage subspace 1 corresponding to the algorithm model information 1. M accelerators are scheduled according to an accelerator scheduling sequence, wherein the algorithm model group 1 correspondingly schedules the accelerator 1, the algorithm model group 2 correspondingly schedules the accelerator 2, and the others may be deduced by analogy. At a $(N+1)^{th}$ frame, the algorithm model instructions in the storage subspace 2 corresponding to the algorithm model information 2 is used. Because historical accelerator scheduling information of the algorithm model group 1 at the $N^{th}$ frame is to correspondingly schedule the accelerator 1, according to the accelerator scheduling sequence, the algorithm model group 1 correspondingly schedules the accelerator 2 at the $(N+1)^{th}$ frame. Similarly, the algorithm model group 2 correspondingly schedules the accelerator 3, . . . , an algorithm model group M−1 correspondingly schedules an accelerator M, and the algorithm model group M correspondingly schedules the accelerator 1. Similarly, at the $(N+2)^{th}$ frame, the algorithm model instructions in the storage subspace 3 corresponding to the algorithm model information 3 is used. The algorithm model group 1 correspondingly schedules the accelerator 3, the algorithm model group 2 correspondingly schedules the accelerator 4, . . . , and the algorithm model group M correspondingly schedules the accelerator 2. Subsequent frames may be deduced by analogy, and details are not described.

According to the method for image processing by using an artificial intelligence accelerator provided in the embodiments of this disclosure, the algorithm model instructions in different storage spaces are used in turns according to the frame interval, and each set of algorithm model instructions is divided into algorithm model instructions respectively corresponding to multiple algorithm model groups. Multiple accelerators are alternately scheduled according to the accelerator alternation sequence to collaboratively process the algorithm model instructions respectively corresponding to the multiple algorithm model groups. Compared to performing verification through redundancy setting of accelerators in related technologies, this disclosure greatly improves effective utilization of accelerator resources, significantly improves processing performance, and effectively reduces costs, without increasing use of memory bandwidth.

In some optional embodiments, step 203 of reading the algorithm model instructions from the first preset storage space storing the algorithm model instructions by using the artificial intelligence accelerator, and executing the algorithm model instructions, to obtain the processing result for the to-be-processed image includes the following steps.

Step 2031, for the artificial intelligence accelerator that needs to execute the algorithm model instructions corresponding to any algorithm model group, read the algorithm model instructions corresponding to the algorithm model group from the first preset storage space by using the artificial intelligence accelerator, and execute the algorithm model instructions, to obtain a processing result corresponding to the algorithm model group.

Different algorithm model groups may have different functions, and the processing result corresponding to each algorithm model group may be obtained through accelerator inference. For any algorithm model group, the accelerator may read the algorithm model instructions corresponding to the algorithm model group from a corresponding storage subspace in the first preset storage space based on a storage space address of the algorithm model instructions corresponding to the algorithm model group.

In some optional embodiments, algorithm models included in any algorithm model group may be independent of each other, or may have dependency relationships. This is not specifically limited. For example, in an autonomous driving scenario, the forward visual perception model and the panoramic perception model may be independent of each other; and the perception fusion model needs to integrate various perceptions, and therefore has a dependency relationship with the perception model. The processing result corresponding to the algorithm model group may include processing results respectively corresponding all algorithm models, and may also include a processing result corresponding to a last algorithm model having a dependency relationship. This may be specifically set according to actual requirements.

In some optional embodiments, after the corresponding algorithm model instruction is executed by each accelerator, the processing result may be returned to a preset storage space, for example, may be sent back to the first preset storage space.

Step 2032. Determine a processing result for the to-be-processed image based on processing results respectively corresponding to the algorithm model groups.

Different algorithm model groups are configured to perform different processing functions, and processing results of all algorithm model groups are integrated to obtain the processing result for the to-be-processed image.

In some optional embodiments, for a case in which multiple accelerators work together, any accelerator (such as an accelerator A) may return the processing result to the preset storage space after inference is completed. If another accelerator (such as an accelerator B) needs to perform subsequent processing based on an inference result of the accelerator A, the another accelerator B may read the inference result of the accelerator A from the preset storage space, for further inference, so as to obtain an inference result of the accelerator B. Communication between the accelerators may also be established, so that the inference result of the accelerator A may be transmitted to the accelerator B, which is not specifically limited.

In the embodiments, processing of multiple accelerators is integrated, so that the processing result corresponding to the to-be-processed image is effectively obtained, thereby improving image processing efficiency.

In some optional embodiments, before determining the algorithm model information corresponding to the to-be-processed image, the method further includes the following steps:

Step 410. Read, based on pre-configured information, algorithm model instructions required for image processing from a second preset storage space.

For the pre-configured information, reference may be made to the content described above, and write counts may be different from the content described above. The write counts in the embodiments is 1.

Step 420. Write the algorithm model instructions into the first preset storage space.

The algorithm model instructions is written into the first preset storage space based on the write operation and the write counts in the pre-configured information.

In the embodiments, by pre-copying the algorithm model information from the second preset storage space to the first preset storage space, the accelerator is enabled to quickly read and execute the algorithm model instructions, thereby improving a data reading speed.

Figure 7:
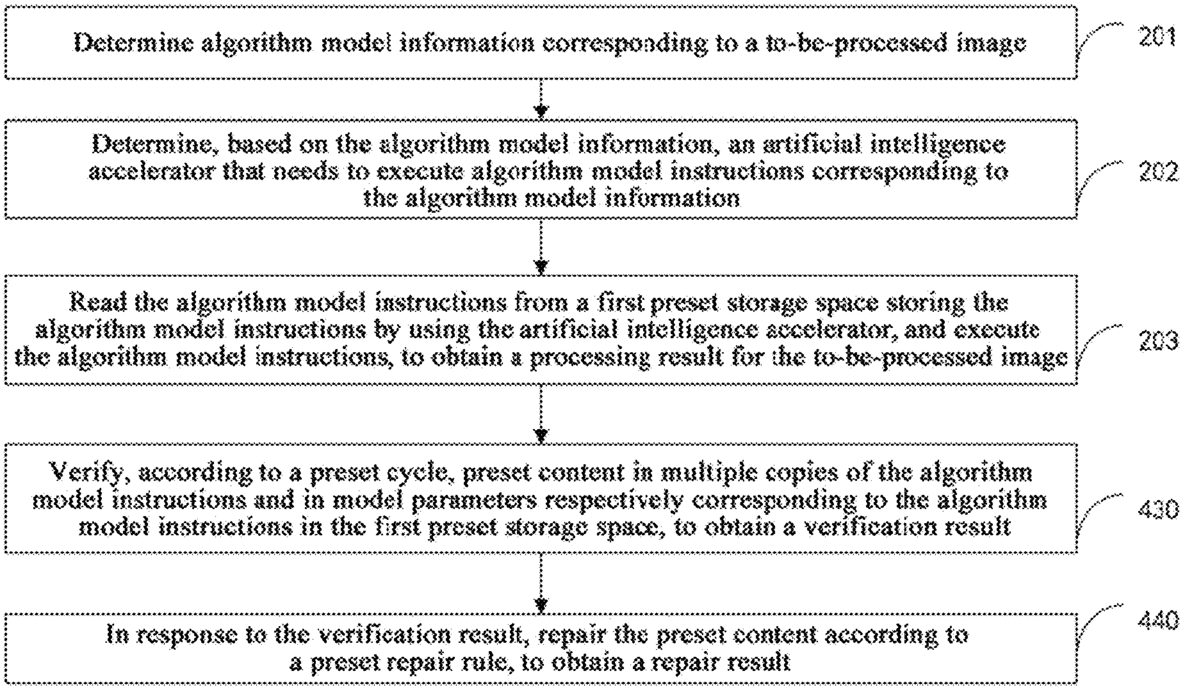
FIG. 7 is a schematic flowchart of a method for image processing by using an artificial intelligence accelerator according to still yet another exemplary embodiment of this disclosure.

FIG. 7 is a schematic flowchart of a method for image processing by using an artificial intelligence accelerator according to still yet another exemplary embodiment of this disclosure.

In some optional embodiments, the first preset storage space stores multiple copies of the algorithm model instructions and model parameters respectively corresponding to the algorithm model instructions. The method in this disclosure further includes the following steps.

Step 430. Verify, according to a preset cycle, preset content in multiple copies of the algorithm model instructions and in the model parameters respectively corresponding to the algorithm model instructions in the first preset storage space, to obtain a verification result.

The preset cycle may be set according to actual requirements, which is not specifically limited in this disclosure. The preset content may be set according to actual requirements. For example, the preset content may be all content of the algorithm model instructions and the model parameter, or may be key content preset in the algorithm model instructions and the model parameter. For example, because an output layer of each algorithm model has significant impact on an inference result of the algorithm model, an instruction and/or a parameter corresponding to the output layer may be used as key content. The verification result may include two types of results: verification succeeded and verification failed. For the result of verification failed, information about error content that causes a failure may also be included, such as an address where an error occurs. A verification manner may be to compare multiple copies of the algorithm model instructions and respective corresponding model parameters to determine whether the multiple copies are the same. If there is different content, it may be determined that there is an error in the preset content.

Step 440. In response to the verification result, repair the preset content according to a preset repair rule, to obtain a repair result.

The preset repair rule may be set according to actual requirements. If the verification result is that there is an error in the preset content, the preset content is repaired according to the preset repair rule to obtain the repair result. For example, correct content may be obtained from correct parts in multiple copies of the preset content, to repair the error content. Alternatively, the correct content may be re-read from the second preset storage space to fix the error content.

In some optional embodiments, to avoid recurrence of error content caused by a storage hardware failure, during repairing, the correct content after the repairing may be written into a space different from that of the error content.

In the embodiments, the algorithm model instructions and the model parameter in the first preset storage space are verified and repaired in a timely manner according to a certain cycle, so that subsequent image processing errors caused by the error content may be effectively avoided, thereby further improving the safety of vehicle driving.

In some optional embodiments, step 430 includes:

verifying, according to a first preset cycle, the multiple copies of the algorithm model instructions and the model parameters respectively corresponding to the algorithm model instructions in the first preset storage space, to obtain a first verification result; and in response to the first verification result, repairing the preset content according to the first repair rule, to obtain a first repair result.

Specifically, all content of the multiple copies of the algorithm model instructions and the model parameters is verified according to the first preset cycle, and is repaired based on the verification result. For example, if there is an error in one or a few of the multiple copies, the correct content may be obtained from a correct copy to fix the error content. If it is unable to determine which copy has an error, the algorithm model instructions and the corresponding model parameter may be re-read from the second preset storage space, to repair the multiple copies of the algorithm model instructions and the model parameters in the first preset storage space.

In some optional embodiments, the method in this disclosure further includes:

verifying, according to a second preset cycle, at least one of preset key instructions and preset key parameters respectively corresponding to the multiple copies of the algorithm model instructions in the first preset storage space, to obtain a second verification result, wherein the second preset cycle is smaller than the first preset cycle; and repairing the error content based on the second verification result according to the second repair rule, to obtain a second repair result.

The preset key instruction and the preset key parameter may be set based on a degree of impact on the inference result of the algorithm model in the algorithm model. For example, if an error occurs to the output layer of the algorithm model or to a model parameter of the output layer, a serious error may occur in an output result. If an error occurs to an anterior model layer in the algorithm model or to the model parameter, impact of a previous error may be constantly reduced in a subsequent inference process, so that a final inference result is more accurate, and thus no serious errors would occur. On this basis, by setting the second preset cycle to be smaller than the first preset cycle, errors in the key content can be detected in a more timely manner, thereby further reducing the probability of image processing errors caused by the storage hardware failure and further improving the safety of vehicle driving.

According to the embodiments of this disclosure, the key content may be quickly checked at high frequency according to the second preset cycle, and all content or non-key content may be checked at low frequency and at a low speed according to the first preset cycle. In this way, issues about resource occupation and error verification may be balanced effectively, so as to quickly detect errors in the key content in a timely manner in a case of relatively lower resource occupation. Due to less impact on the inference result, other content is checked at lower frequency, so as to reduce resource occupation.

Figure 8:
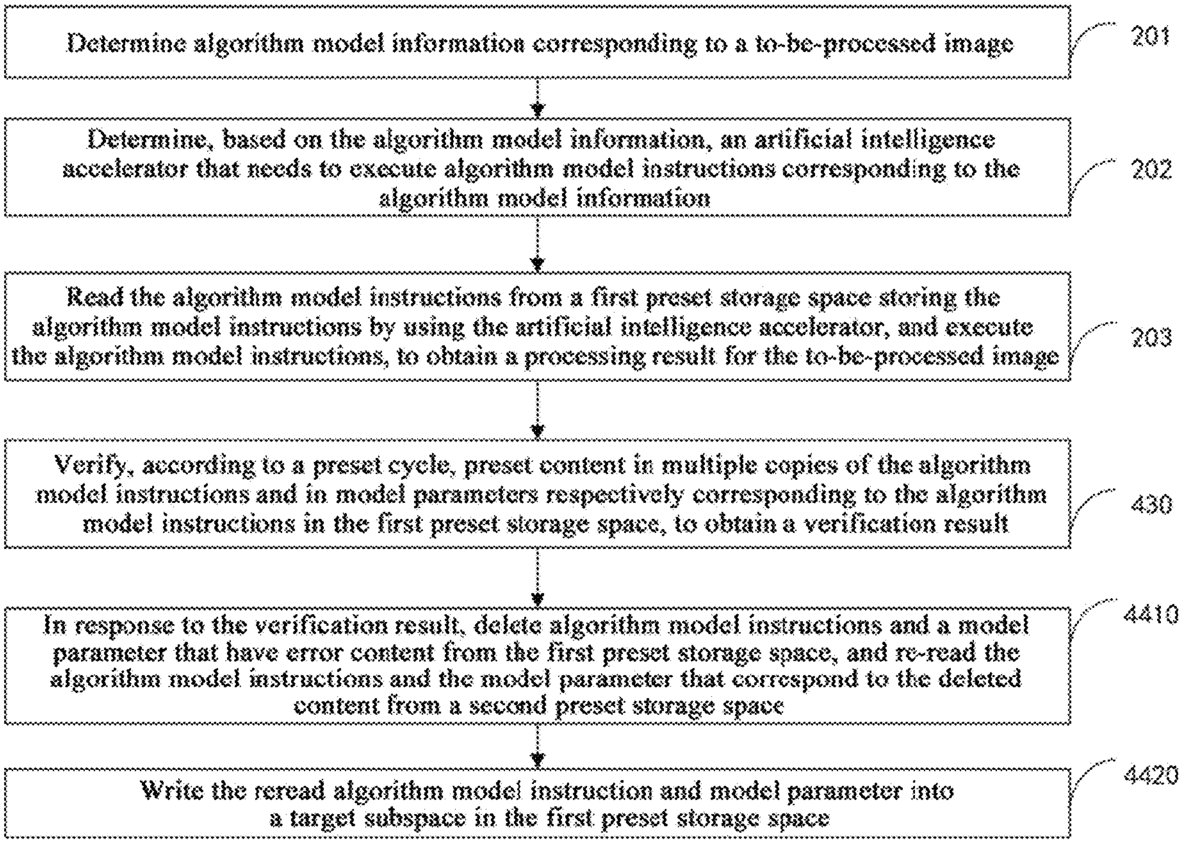
FIG. 8 is a schematic flowchart of a method for image processing by using an artificial intelligence accelerator according to a further exemplary embodiment of this disclosure.

FIG. 8 is a schematic flowchart of a method for image processing by using an artificial intelligence accelerator according to a further exemplary embodiment of this disclosure.

In some optional embodiments, step 440 of repairing the preset content according to the preset repair rule, in response to the verification result, to obtain the repair result includes the following steps:

Step 4410: in response to the verification result, delete algorithm model instructions and a model parameter that have error content from the first preset storage space, and re-read the algorithm model instructions and the model parameter that correspond to the deleted content from the second preset storage space.

One or more copies of the algorithm model instructions and the model parameter that have error content may be deleted from the first preset storage space, thereby avoiding re-reading algorithm model instructions or a model parameter with an error in the following. The algorithm model instructions and the model parameter that correspond to the deleted content are re-read from the second preset storage space based on the pre-configured information.

Step 4420: Write the reread algorithm model instruction and model parameter into a target subspace in the first preset storage space.

The target subspace is a subspace different from that of the error content.

In the embodiments, the re-read algorithm model instruction and model parameter are written into the target subspace different from the subspace where the error content is located, so that recurrence of errors caused by a hardware failure in the subspace where the error content is located may be avoided. In this way, accurate and effective algorithm model instructions are provided for subsequent image processing, thereby further prolonging the error tolerance time and improving the safety of vehicle driving.

Figure 9:
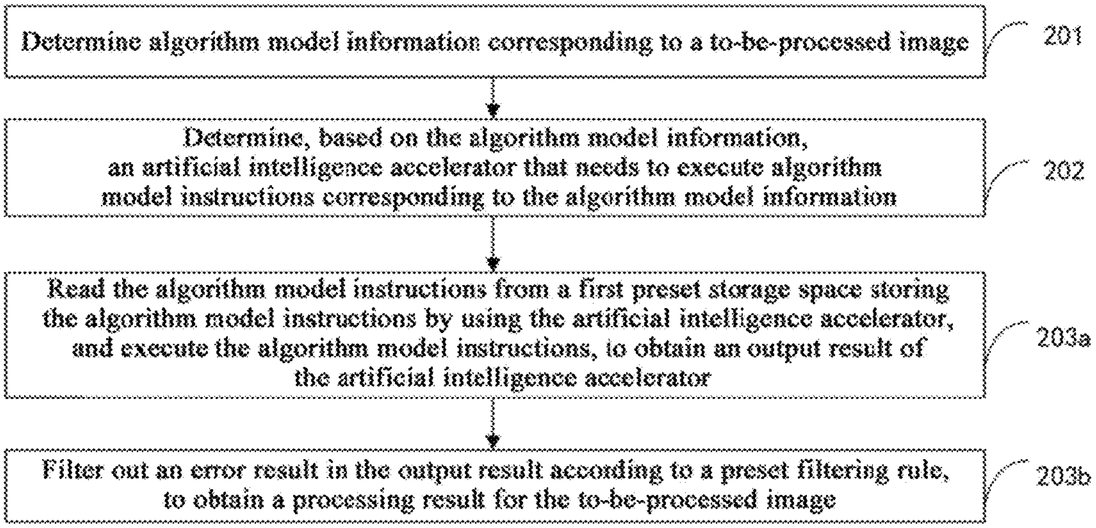
FIG. 9 is a schematic flowchart of a method for image processing by using an artificial intelligence accelerator according to a still further exemplary embodiment of this disclosure.

FIG. 9 is a schematic flowchart of a method for image processing by using an artificial intelligence accelerator according to a still further exemplary embodiment of this disclosure.

In some optional embodiments, step 203 of reading the algorithm model instructions from the first preset storage space storing the algorithm model instructions by using the artificial intelligence accelerator, and executing the algorithm model instructions, to obtain the processing result for the to-be-processed image, includes the following steps.

Step 203*a*: Read the algorithm model instructions from the first preset storage space storing the algorithm model instructions by using the artificial intelligence accelerator, and execute the algorithm model instructions, to obtain an output result of the artificial intelligence accelerator.

For specific operations of this step, reference may be made to the foregoing embodiments, and details are not described herein again.

Step 203*b*: Filter out an error result in the output result according to a preset filtering rule, to obtain the processing result for the to-be-processed image.

The preset filtering rule may be set according to actual requirements. For example, the preset filtering rule may be a rule of multi-frame check or Kalman filtering, which is not specifically limited.

In the embodiments, after the output result of the accelerator is obtained, occasional inference errors in the output result may be further filtered out according to the preset filtering rule, thereby further improving safety.

The foregoing embodiments of this disclosure may be implemented separately or in any combination without conflict. This may be specifically set according to actual requirements, and is not limited in this disclosure.

Any method for image processing by using an artificial intelligence accelerator provided in the embodiments of this disclosure may be implemented by any suitable device with a data processing capability, including but not limited to a terminal device and a server. Alternatively, any method for image processing by using an artificial intelligence accelerator provided in the embodiments of this disclosure may be implemented by a processor. For example, the processor implements any method for image processing by using an artificial intelligence accelerator described in the embodiments of this disclosure by invoking corresponding instructions stored in the memory. Details are not described below again.

Exemplary Apparatus

Figure 10:
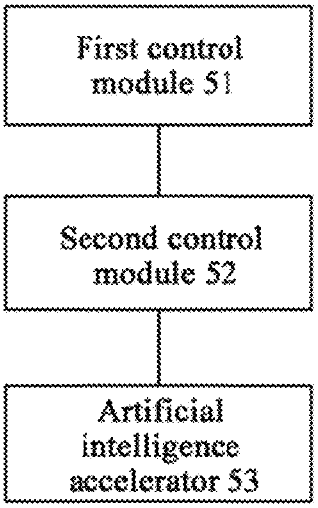
FIG. 10 is a schematic diagram of a structure of an apparatus for image processing by using an artificial intelligence accelerator according to an exemplary embodiment of this disclosure.

FIG. 10 is a schematic diagram of a structure of an apparatus for image processing by using an artificial intelligence accelerator according to an exemplary embodiment of this disclosure. The apparatus in this embodiment may be configured to implement the corresponding method embodiments of the method for image processing by using an artificial intelligence accelerator in this disclosure. The apparatus shown in FIG. 10 includes a first control module 51, a second control module 52, and an artificial intelligence accelerator 53.

The first control module 51 is configured to determine algorithm model information corresponding to a to-be-processed image.

The second control module 52 is configured to determine, based on the algorithm model information, an artificial intelligence accelerator that needs to execute algorithm model instructions corresponding to the algorithm model information.

The artificial intelligence accelerator 53 is configured to read the algorithm model instructions from a first preset storage space storing the algorithm model instructions, and execute the algorithm model instructions, to obtain a processing result for the to-be-processed image.

Figure 11:
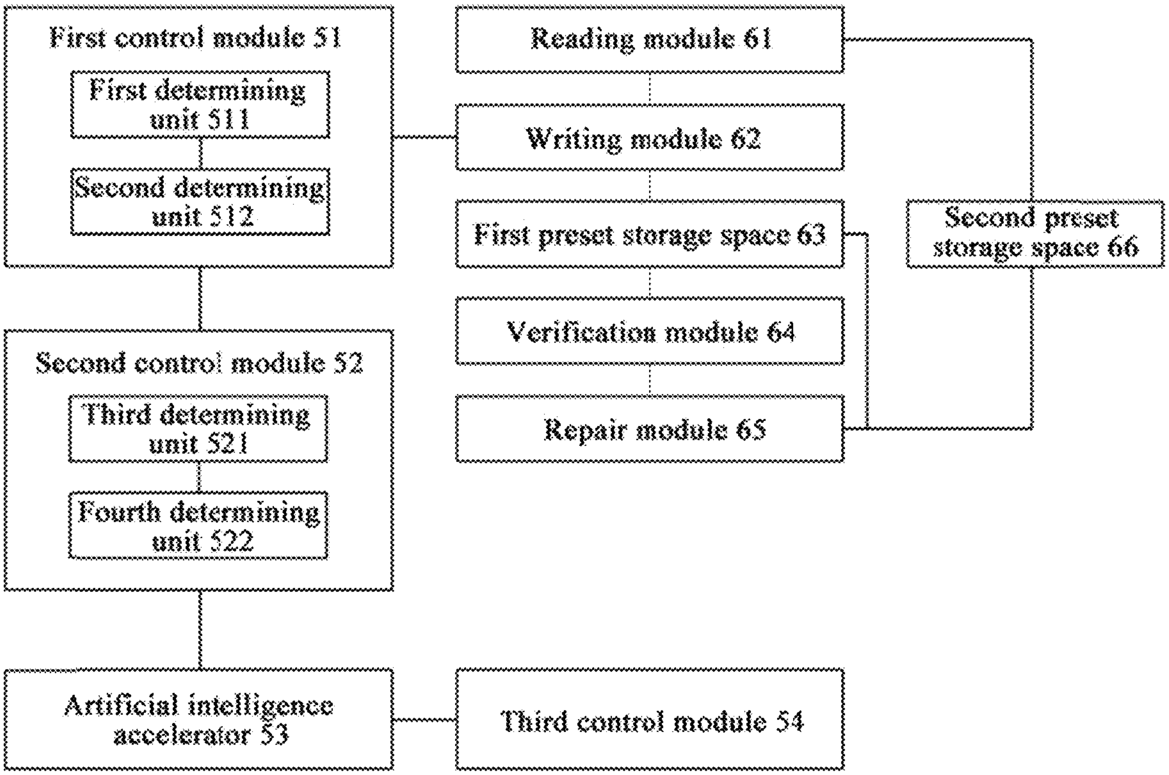
FIG. 11 is a schematic diagram of a structure of an apparatus for image processing by using an artificial intelligence accelerator according to another exemplary embodiment of this disclosure.

FIG. 11 is a schematic diagram of a structure of an apparatus for image processing by using an artificial intelligence accelerator according to another exemplary embodiment of this disclosure.

In some optional embodiments, the first control module 51 includes a first determining unit 511 and a second determining unit 512.

The first determining unit 511 is configured to determine current frame information corresponding to the to-be-processed image.

The second determining unit 512 is configured to determine, based on a mapping rule between the frame information and the algorithm model information, algorithm model information corresponding to the current frame information from multiple pieces of algorithm model information.

The multiple pieces of algorithm model information respectively correspond to same algorithm model instructions in different storage subspaces in the first preset storage space.

In some optional embodiments, the apparatus in this disclosure further includes a reading module 61 and a writing module 62.

The reading module 61 is configured to read, based on pre-configured information, algorithm model instructions required for image processing from a second preset storage space.

The writing module 62 is configured to write the algorithm model instructions into multiple different storage subspaces in the first preset storage space.

In some optional embodiments, the second control module 52 includes a third determining unit 521 and a fourth determining unit 522.

The third determining unit 521 is configured to determine an accelerator alternate scheduling rule corresponding to the algorithm model information.

The fourth determining unit 522 is configured to determine, according to the accelerator alternate scheduling rule, the artificial intelligence accelerator that currently needs to execute the algorithm model instructions corresponding to the algorithm model information, from multiple artificial intelligence accelerators.

In some optional embodiments, the fourth processing unit 522 is specifically configured to:

determine an accelerator alternation sequence according to the accelerator alternate scheduling rule; and determine, according to the accelerator alternation sequence, the artificial intelligence accelerator that currently needs to execute the algorithm model instructions corresponding to the algorithm model information.

In some optional embodiments, the fourth processing unit 522 is specifically configured to:

determine identification information respectively corresponding to multiple algorithm models based on the algorithm model information; determine an accelerator alternation sequence according to the accelerator alternate scheduling rule; determine multiple algorithm model groups corresponding to the algorithm model information based on the identification information respectively corresponding to the algorithm models and a preset grouping rule, wherein each algorithm model group includes the identification information of at least one algorithm model; and for any algorithm model group, determine an artificial intelligence accelerator that currently needs to execute algorithm model instructions corresponding to the algorithm model group based on historical accelerator scheduling information corresponding to the algorithm model group and according to the accelerator alternation sequence.

In some optional embodiments, the artificial intelligence accelerator that needs to execute the algorithm model instructions corresponding to any algorithm model group is configured to read the algorithm model instructions corresponding to the algorithm model group from the first preset storage space, and execute the algorithm model instructions, to obtain the processing result corresponding to the algorithm model group.

The apparatus in this disclosure further includes: a third control module 54, configured to determine a processing result for the to-be-processed image based on processing results respectively corresponding to the algorithm model groups.

In some optional embodiments, referring to FIG. 11, the apparatus in this disclosure further includes a reading module 61 and a writing module 62.

The reading module 61 is configured to read, based on pre-configured information, algorithm model instructions required for image processing from a second preset storage space.

The writing module 62 is configured to write the algorithm model instructions into the first preset storage space.

In some optional embodiments, the apparatus in this disclosure further includes a first preset storage space 63 for storing multiple copies of the algorithm model instructions and model parameters respectively corresponding to algorithm model instructions.

In some optional embodiments, the first preset storage space 63 may be a memory space in a memory.

In some optional embodiments, the apparatus in this disclosure further includes a verification module 64 and a repair module 65.

The verification module 64 is configured to verify, according to a preset cycle, preset content in the multiple copies of the algorithm model instructions and in the model parameters respectively corresponding to the algorithm model instructions in the first preset storage space, to obtain a verification result.

The repair module 65 is configured to in response to the verification result, repair the preset content according to a preset repair rule, to obtain a repair result.

In some optional embodiments, the repair module 65 is specifically configured to:

in response to the verification result, delete algorithm model instructions and a model parameter that have error content from the first preset storage space, and re-read the algorithm model instructions and the model parameter that correspond to the deleted content from the second preset storage space; and write the reread algorithm model instruction and model parameter into a target subspace in the first preset storage space. The target subspace is a subspace different from that of the error content.

In some optional embodiments, the artificial intelligence accelerator 53 is specifically configured to read the algorithm model instructions from the first preset storage space storing the algorithm model instructions, and execute the algorithm model instructions, to obtain an output result of the artificial intelligence accelerator.

The third control module 54 is further configured to filter out an error result in the output result according to a preset filtering rule, to obtain the processing result for the to-be-processed image.

In some optional embodiments, the apparatus in this disclosure further includes a second preset storage space 66 for storing the algorithm model instructions. The second preset storage space 66 may be a storage space in an external storage space such as a hard disk, a floppy disk, or a compact disc.

For beneficial technical effects corresponding to the exemplary embodiments of this apparatus, reference may be made to the corresponding beneficial technical effects in the part of exemplary method described above, and details are not described herein again.

Figure 12:
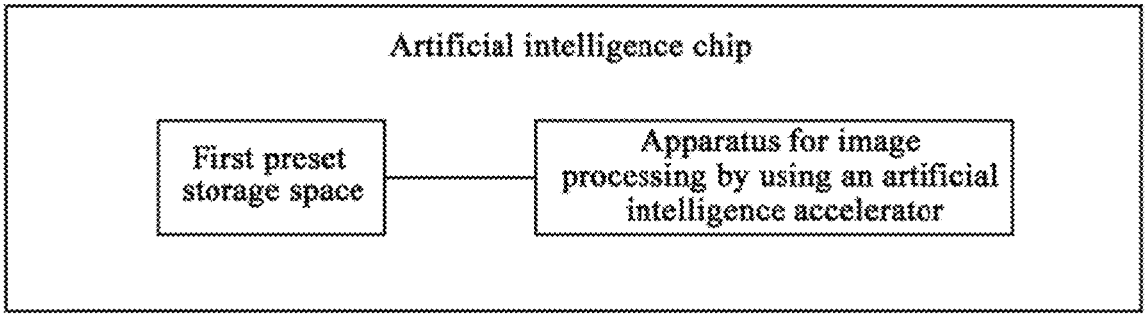
FIG. 12 is a schematic diagram of a structure of an artificial intelligence chip according to an exemplary embodiment of this disclosure.

FIG. 12 is a schematic diagram of a structure of an artificial intelligence chip according to an exemplary embodiment of this disclosure. The artificial intelligence chip includes: a first preset storage space and an apparatus for image processing by using an artificial intelligence accelerator. The apparatus for image processing by using an artificial intelligence accelerator is configured to implement the method for image processing by using an artificial intelligence accelerator according to any one of the foregoing embodiments.

In some optional embodiments, The artificial intelligence chip in this disclosure may also include other related modules or units, such as an internal bus, another IP (intellectual property) core, a CPU (central processing unit) cluster, a security island, other hardware modules, and software modules such as a post-processing module. This may be specifically set according to actual requirements.

For beneficial effects corresponding to the embodiments of this chip, reference may be made to the corresponding beneficial technical effects in the part of exemplary method described above, and details are not described herein again.

Exemplary Electronic Device

Figure 13:
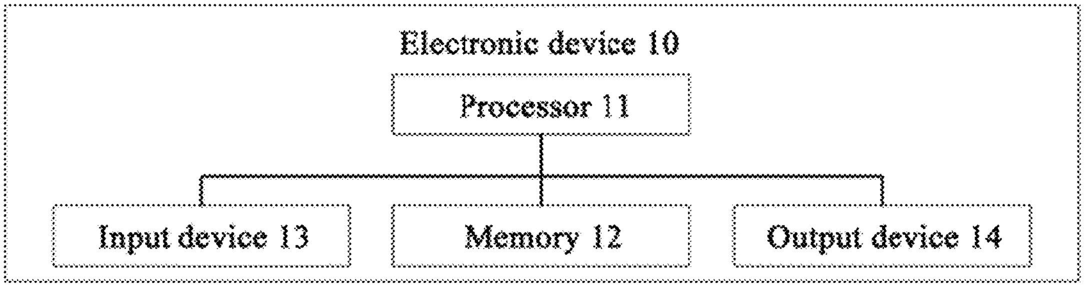
FIG. 13 is a diagram of a structure of an electronic device according to an embodiment of this disclosure.

FIG. 13 is a schematic diagram of a structure of an electronic device according to an embodiment of this disclosure. The electronic device includes at least one processor 11 and a memory 12.

The processor 11 may be a central processing unit (CPU) or another form of processing unit having a data processing capability and/or an instruction execution capability, and may control another component in the electronic device 10 to perform a desired function.

The memory 12 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 11 may execute one or more of the program instructions to implement the methods according to various embodiments of this disclosure that are described above and/or other desired functions.

In an example, the electronic device 10 may further include an input device 13 and an output device 14. These components are connected to each other through a bus system and/or another form of connection mechanism (not shown).

The input device 13 may further include, for example, a keyboard and a mouse.

The output device 14 may output various information to the outside, and may include, for example, a display, a speaker, a printer, a communication network, and a remote output device connected by the communication network.

Certainly, for simplicity, FIG. 13 shows only some of components in the electronic device 10 that are related to this disclosure, and components such as a bus and an input/output interface are omitted. In addition, according to specific application situations, the electronic device 10 may further include any other appropriate components.

Exemplary Computer Program Product and Computer Readable Storage Medium

In addition to the foregoing methods and devices, the embodiments of this disclosure may also provide a computer program product, which includes computer program instructions. When the computer program instructions are run by a processor, the processor is enabled to perform the steps, of the methods according to the embodiments of this disclosure, that are described in the “exemplary method” part described above.

The computer program product may be program code, written with one or any combination of a plurality of programming languages, that are configured to perform the operations in the embodiments of this disclosure. The programming languages include an object-oriented programming language such as Java or C++, and further include a conventional procedural programming language such as a “C” language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this disclosure may further relate to a computer readable storage medium, which stores computer program instructions. When the computer program instructions are run by a processor, the processor is enabled to perform the steps, of the methods according to the embodiments of this disclosure, that are described in the “exemplary method” part described above.

The computer readable storage medium may be one readable medium or any combination of a plurality of readable media. The readable medium may be a readable signal medium or a readable storage medium. The readable storage medium includes, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

A person skilled in the art may make various modifications and variations to this disclosure without departing from the spirit and the scope of this application. In this way, if these modifications and variations of this application fall within the scope of the claims and equivalent technologies of the claims of this disclosure, this disclosure also intends to include these modifications and variations.

What is claimed is:

1. A method for image processing by using an artificial intelligence accelerator, the method being applied to an electronic device, and comprising:

determining algorithm model information corresponding to a to-be-processed image comprising a plurality of images, the algorithm model information comprising information of a set of algorithm model instructions required for image processing;

determining an accelerator alternate scheduling rule corresponding to the algorithm model information, wherein the accelerator alternate scheduling rule comprises scheduling multiple artificial intelligence accelerators alternately according to a preset frame interval;

determining, according to the accelerator alternate scheduling rule and from the multiple artificial intelligence accelerators, an artificial intelligence accelerator that needs to execute the algorithm model instructions corresponding to the algorithm model information at a current frame; and reading the algorithm model instructions from a first preset storage space storing the algorithm model instructions by using the artificial intelligence accelerator that needs to execute the algorithm model instructions corresponding to the algorithm model information at the current frame, and executing the algorithm model instructions, to obtain a processing result for the to-be-processed image, wherein a same set of the algorithm model instructions are stored respectively in different storage subspaces in the first preset storage space.

2. The method according to claim 1, wherein the determining algorithm model information corresponding to a to-be-processed image comprises:

determining current frame information corresponding to the to-be-processed image; and determining, based on a mapping rule between the frame information and the algorithm model information, algorithm model information corresponding to the current frame information from multiple pieces of algorithm model information, wherein the multiple pieces of algorithm model information respectively correspond to same algorithm model instructions in the different storage subspaces in the first preset storage space.

3. The method according to claim 1, wherein the method further comprises: before the determining algorithm model information corresponding to a to-be-processed image, reading, based on pre-configured information, the algorithm model instructions required for image processing from a second preset storage space; and writing the algorithm model instructions into the multiple different storage subspaces in the first preset storage space.

4. The method according to claim 1, wherein the determining, according to the accelerator alternate scheduling rule and from the multiple artificial intelligence accelerators, an artificial intelligence accelerator that needs to execute the algorithm model instructions corresponding to the algorithm model information at a current frame comprises:

determining an accelerator alternation sequence according to the accelerator alternate scheduling rule; and determining, according to the accelerator alternation sequence, the artificial intelligence accelerator that needs to execute the algorithm model instructions corresponding to the algorithm model information at the current frame.

5. The method according to claim 1, wherein the determining, according to the accelerator alternate scheduling rule and from the multiple artificial intelligence accelerators, an artificial intelligence accelerator that needs to execute the algorithm model instructions corresponding to the algorithm model information at a current frame comprises:

determining identification information respectively corresponding to multiple algorithm models based on the algorithm model information;

determining an accelerator alternation sequence according to the accelerator alternate scheduling rule;

determining multiple algorithm model groups corresponding to the algorithm model information based on the identification information respectively corresponding to the algorithm models and a preset grouping rule, wherein each algorithm model group comprises the identification information of at least one algorithm model; and for any algorithm model group, determining an artificial intelligence accelerator that needs to execute algorithm model instructions corresponding to the algorithm model group at the current frame, based on historical accelerator scheduling information corresponding to the algorithm model group and according to the accelerator alternation sequence.

6. The method according to claim 5, wherein the reading the algorithm model instructions from a first preset storage space storing the algorithm model instructions by using the artificial intelligence accelerator that needs to execute the algorithm model instructions corresponding to the algorithm model information at the current frame, and executing the algorithm model instructions, to obtain a processing result for the to-be-processed image, comprises:

for the artificial intelligence accelerator that needs to execute the algorithm model instructions corresponding to any algorithm model group, reading the algorithm model instructions corresponding to the algorithm model group from the first preset storage space by using the artificial intelligence accelerator, and executing the algorithm model instructions, to obtain a processing result corresponding to the algorithm model group; and determining a processing result for the to-be-processed image based on processing results respectively corresponding to the algorithm model groups.

7. The method according to claim 1, wherein the method further comprises: before the determining algorithm model information corresponding to a to-be-processed image, reading, based on pre-configured information, the algorithm model instructions required for image processing from a second preset storage space; and writing the algorithm model instructions into the first preset storage space.

8. The method according to claim 1, wherein the first preset storage space stores multiple copies of the algorithm model instructions and model parameters respectively corresponding to algorithm model instructions; and the method further comprises:

verifying, according to a preset cycle, preset content in the multiple copies of the algorithm model instructions and in the model parameters respectively corresponding to the algorithm model instructions in the first preset storage space, to obtain a verification result; and in response to the verification result, repairing the preset content according to a preset repair rule, to obtain a repair result.

9. The method according to claim 8, wherein the repairing the preset content according to a preset repair rule, to obtain a repair result comprises:

deleting algorithm model instructions and a model parameter that have error content from the first preset storage space, and re-reading the algorithm model instructions and the model parameter that correspond to the deleted content from the second preset storage space; and writing the re-read algorithm model instruction and model parameter into a target subspace in the first preset storage space, wherein the target subspace is a subspace different from that of the error content.

10. The method according to claim 1, wherein the reading the algorithm model instructions from a first preset storage space storing the algorithm model instructions by using the artificial intelligence accelerator that needs to execute the algorithm model instructions corresponding to the algorithm model information at the current frame, and executing the algorithm model instructions, to obtain a processing result for the to-be-processed image, comprises:

reading the algorithm model instructions from the first preset storage space storing the algorithm model instructions by using the artificial intelligence accelerator that needs to execute the algorithm model instructions corresponding to the algorithm model information at the current frame, and executing the algorithm model instructions, to obtain an output result of the artificial intelligence accelerator; and filtering out an error result in the output result according to a preset filtering rule, to obtain the processing result for the to-be-processed image.

11. An artificial intelligence chip, comprising:

a first preset storage space and an apparatus for image processing by using an artificial intelligence accelerator, wherein the apparatus for image processing by using an artificial intelligence accelerator is configured to implement a method for image processing by using an artificial intelligence accelerator, the method being applied to an electronic device, wherein the method for image processing by using an artificial intelligence accelerator comprises:

determining algorithm model information corresponding to a to-be-processed image comprising a plurality of images, the algorithm model information comprising information of a set of algorithm model instructions required for image processing;

determining an accelerator alternate scheduling rule corresponding to the algorithm model information, wherein the accelerator alternate scheduling rule comprises scheduling multiple artificial intelligence accelerators alternately according to a preset frame interval;

determining, according to the accelerator alternate scheduling rule and from the multiple artificial intelligence accelerators, an artificial intelligence accelerator that needs to execute the algorithm model instructions corresponding to the algorithm model information at a current frame; and reading the algorithm model instructions from a first preset storage space storing the algorithm model instructions by using the artificial intelligence accelerator that needs to execute the algorithm model instructions corresponding to the algorithm model information at the current frame, and executing the algorithm model instructions, to obtain a processing result for the to-be-processed image, wherein a same set of the algorithm model instructions are stored respectively in different storage subspaces in the first preset storage space.

12. The chip according to claim 11, wherein the determining algorithm model information corresponding to a to-be-processed image comprises:

determining current frame information corresponding to the to-be-processed image; and determining, based on a mapping rule between the frame information and the algorithm model information, algorithm model information corresponding to the current frame information from multiple pieces of algorithm model information, wherein the multiple pieces of algorithm model information respectively correspond to same algorithm model instructions in the different storage subspaces in the first preset storage space.

13. The chip according to claim 11, wherein the method further comprises: before the determining algorithm model information corresponding to a to-be-processed image, reading, based on pre-configured information, the algorithm model instructions required for image processing from a second preset storage space; and writing the algorithm model instructions into the multiple different storage subspaces in the first preset storage space.

14. The chip according to claim 11, wherein the determining, according to the accelerator alternate scheduling rule and from the multiple artificial intelligence accelerators, an artificial intelligence accelerator that needs to execute the algorithm model instructions corresponding to the algorithm model information at a current frame comprises:

determining an accelerator alternation sequence according to the accelerator alternate scheduling rule; and determining, according to the accelerator alternation sequence, the artificial intelligence accelerator that needs to execute the algorithm model instructions corresponding to the algorithm model information at the current frame.

15. The chip according to claim 11, wherein the determining, according to the accelerator alternate scheduling rule and from the multiple artificial intelligence accelerators, an artificial intelligence accelerator that needs to execute the algorithm model instructions corresponding to the algorithm model information at a current frame comprises:

determining identification information respectively corresponding to multiple algorithm models based on the algorithm model information;

determining an accelerator alternation sequence according to the accelerator alternate scheduling rule;

determining multiple algorithm model groups corresponding to the algorithm model information based on the identification information respectively corresponding to the algorithm models and a preset grouping rule, wherein each algorithm model group comprises the identification information of at least one algorithm model; and for any algorithm model group, determining an artificial intelligence accelerator that needs to execute algorithm model instructions corresponding to the algorithm model group at the current frame, based on historical accelerator scheduling information corresponding to the algorithm model group and according to the accelerator alternation sequence.

16. The chip according to claim 15, wherein the reading the algorithm model instructions from a first preset storage space storing the algorithm model instructions by using the artificial intelligence accelerator that needs to execute the algorithm model instructions corresponding to the algorithm model information at the current frame, and executing the algorithm model instructions, to obtain a processing result for the to-be-processed image, comprises:

for the artificial intelligence accelerator that needs to execute the algorithm model instructions corresponding to any algorithm model group, reading the algorithm model instructions corresponding to the algorithm model group from the first preset storage space by using the artificial intelligence accelerator, and executing the algorithm model instructions, to obtain a processing result corresponding to the algorithm model group; and determining a processing result for the to-be-processed image based on processing results respectively corresponding to the algorithm model groups.

17. The chip according to claim 11, wherein the method further comprises: before the determining algorithm model information corresponding to a to-be-processed image, reading, based on pre-configured information, the algorithm model instructions required for image processing from a second preset storage space; and writing the algorithm model instructions into the first preset storage space.

18. The chip according to claim 11, wherein the first preset storage space stores multiple copies of the algorithm model instructions and model parameters respectively corresponding to algorithm model instructions; and the method further comprises:

verifying, according to a preset cycle, preset content in the multiple copies of the algorithm model instructions and in the model parameters respectively corresponding to the algorithm model instructions in the first preset storage space, to obtain a verification result; and in response to the verification result, repairing the preset content according to a preset repair rule, to obtain a repair result.

* * * * *